March 31, 1925.
C. E. BAKER
FISHHOOK GUARD
Filed March 30, 1923
1,531,725
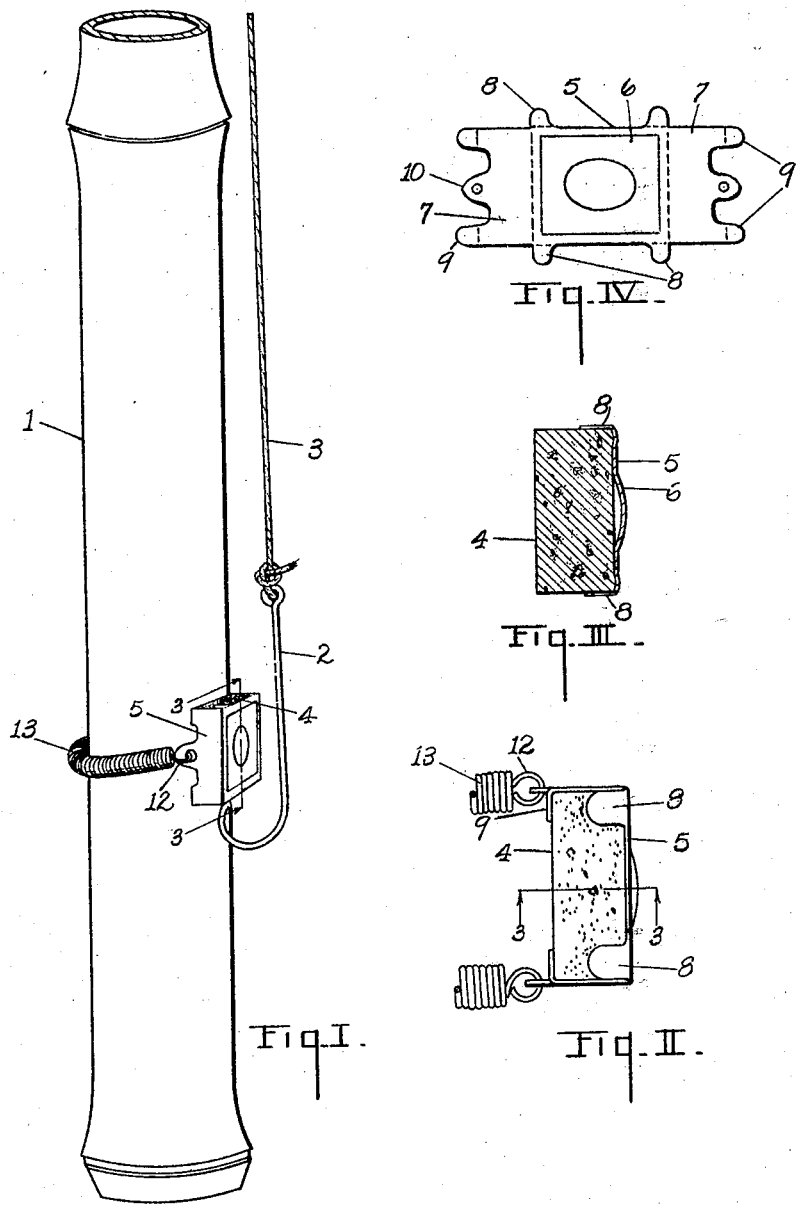
C. E. Baker,
INVENTOR.
BY
Chappell Earl
ATTORNEYS Patented Mar. 31, 1925.

1,531,725

UNITED STATES PATENT OFFICE.

CLARENCE E. BAKER, OF KENDALLVILLE, INDIANA.

FISHHOOK GUARD.

Application filed March 30, 1923. Serial No. 628,720.

*To all whom it may concern:*

Be it known that I, CLARENCE E. BAKER, a citizen of the United States, residing at Kendallville, county of Noble, State of Indiana, have invented certain new and useful Improvements in Fishhook Guards, of which the following is a specification.

This invention relates to improvements in fish hook guards.

The main objects of this invention are:

First, to provide an improved fish hook guard adapted for attachment to fishing poles such as the well-known cane poles which may be readily applied or removed and is adapted for poles of varying diameters.

Second, to provide an improved fish hook guard which effectively supports the point of the hook to prevent injury to the person or to the hook when not in use and also one which is adapted to protect the point of the hook.

Third, to provide an improved fish hook guard which is very economical in structure.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a perspective view of my improved fish hook guard mounted upon a section of pole and having a hook engaged therewith.

Fig. II is an end elevation of my improved fish hook guard, the attaching spring being partially broken away.

Fig. III is a detail longitudinal section on a line corresponding to line 3—3 of Figs. I and II.

Fig. IV is a plan view of the sheet metal blank from which the holder portion of my improved guard is formed.

In the drawing similar reference characters refer to similar parts throughout the several views, and the sectional views are taken looking in the direction of the little arrows at the ends of the section lines.

Referring to the drawing, 1 represents the butt of a cane pole, 2 a hook and 3 a fishing line. These parts are shown in order to illustrate the adaptation and use of my improved guard.

My improved fish hook guard comprises a block 4 of cork or other suitable material in which the point of a hook may be embedded and retained, as indicated in Fig. I. This block is supported in a holder 5 formed as an integral sheet metal stamping and comprises a top portion 6 and side portions 7.

The top portion is provided with integral extensions or lugs 8 which are folded upon the ends of the block 4 while the side portions are provided with integral extensions or lugs 9 which are folded on the underside of the block thereby effectively securing the block in the holder and at the same time exposing its ends to be engaged with the hook.

The sides 7 are provided with integral ears 10 perforated at 11 to receive the terminal hooks 12 of the coiled spring 13. This spring is of such length as to embrace the fishing pole as shown in Fig. I, thereby adjustably and removably securing the guard upon the pole.

My improved fish hook guard is light in weight and simple and compact in structure. It is adjustably retained upon the pole and is adapted for poles of varying diameters.

I have illustrated and described an embodiment which I have found very practical. I have not attempted to illustrate or describe certain embodiments or adaptations which I contemplate as I believe the disclosure made will enable those skilled in the art to which my invention relates to adapt or embody the same as may be desired.

Having thus described my invention, what I claim as new and desire to secure by Letters Patent, is:

1. A fish hook guard comprising a block in which the point of a hook may be embedded, a holder therefor comprising integral top and sides, the top having integral end lugs folded upon the ends of the block, the sides having integral lugs folded upon the bottom of the block whereby it is retained within the holder, said sides having integral centrally disposed perforated ears, and a coiled spring having its ends engaging with said ears whereby the guard may be adjustably and removably mounted upon a fishing rod.

2. A fish hook guard comprising a block in which the point of a hook may be embedded, a holder therefor comprising integral top and sides, the top having integral end lugs folded upon the ends of the block, the sides having integral lugs folded upon the bottom of the block whereby it is retained with the holder, and a rod engaging spring connected to said holder whereby the guard may be adjustably and removably mounted upon a fishing rod.

3. A fish hook guard comprising a block in which the point of a hook may be embedded, a holder therefor comprising integral top and sides, the top having integral end lugs folded upon the ends of the block, the sides having integral lugs folded upon the bottom of the block whereby it is retained within the holder, and means for mounting said holder upon a fishing rod.

In witness whereof, I have hereunto set my hand and seal.

CLARENCE E. BAKER. [L. S.]